United States Patent
Cheung et al.

(10) Patent No.: US 10,860,513 B1
(45) Date of Patent: Dec. 8, 2020

(54) I3C HUB PROMOTING BACKWARD COMPATIBILITY WITH I²C

(71) Applicant: Diodes Incorporated, Milpitas, CA (US)

(72) Inventors: Sin Luen Cheung, Tseung Kwan O (HK); Chi Wa Lo, Kowloon (HK)

(73) Assignee: Diodes Incorporated, Milpitas, CA (US)

( * ) Notice: Subject to any disclaimer, the term of this patent is extended or adjusted under 35 U.S.C. 154(b) by 0 days.

(21) Appl. No.: 16/712,555

(22) Filed: Dec. 12, 2019

(51) Int. Cl.
*G06F 13/14* (2006.01)
*G06F 13/40* (2006.01)
*G06F 13/42* (2006.01)

(52) U.S. Cl.
CPC ...... *G06F 13/4027* (2013.01); *G06F 13/4282* (2013.01); *G06F 2213/0016* (2013.01)

(58) Field of Classification Search
CPC .. G06F 13/00; G06F 13/4027; G06F 13/4282; G06F 2213/0016

USPC ......................................... 710/303, 305–306
See application file for complete search history.

(56) References Cited

U.S. PATENT DOCUMENTS

2017/0286358 A1\* 10/2017 Srivastava ............ G06F 13/364
2019/0129464 A1\* 5/2019 Graif ........................ G06F 1/04

OTHER PUBLICATIONS

"Specification for I3C Basic^SM: Improved Inter Integrated Circuit—Basic," MIPI Alliance, Inc., Version 1.0, Jul. 19, 2018, 172 pages.

\* cited by examiner

*Primary Examiner* — Tim T Vo
*Assistant Examiner* — Kim T Huynh
(74) *Attorney, Agent, or Firm* — Weaver Austin Villeneuve & Sampson LLP

(57) ABSTRACT

A hub device enables the deployment of I²C devices in a system that also includes I3C devices. The hub has an I3C-compliant interface with which it communicates with an I3C master(s) on an I3C bus, an I²C-compliant interface with which it communicates with I²C devices on an I²C bus, and logic and memory that supports the conversion between the two domains.

12 Claims, 4 Drawing Sheets

I3C HUB PROMOTING BACKWARD COMPATIBILITY WITH I²C

BACKGROUND

The Inter-Integrated Circuit (I²C) standard describes a multi-master, multi-slave serial computer bus that is widely used for attaching lower-speed peripheral integrated circuits (ICs) and sensors to processors and microcontrollers in short-distance, intra-board communication. The proliferation of sensors in mobile wireless and related products has created significant design challenges. Because there are no consistent methods for interfacing with physical sensors in such products, device and platform designers are faced with digital serial interface fragmentation that includes I²C, Serial Peripheral Interface (SPI), and Universal Asynchronous Receiver-Transmitter (UART), among others. These challenges may be understood with reference to FIG. 1.

FIG. 1 shows an example of a system that includes a host system-on-a-chip (SOC) integrated circuit connected to a variety of I²C and SPI devices. In addition to the main serial bus interface for each of the devices, the system requires other dedicated interfaces for sideband signals for each of the devices (e.g., dedicated interrupts, chip select signals, enable signals, sleep signals, etc.). This means that, as the number of peripheral devices increases, the required number of general-purpose input/output (GPIO) pins for the host and the printed circuit board (PCB) layer count increase, driving up system cost and complexity. As a result, the number of sensors in current products has become increasingly difficult to support.

To address these issues, the Mobile Industry Processor Interface (MIPI) Alliance has developed the Improved Inter-Integrated Circuit (I3C) standard which describes a fast, two-wire digital serial interface for peripherals such as sensors. The I3C standard is intended to improve upon the features of the I²C standard while also preserving backward compatibility with I²C devices. As shown in FIG. 2, I3C requires only two connections to the I3C host SOC for the same number of I3C peripherals as the system of FIG. 1. Thus, the I3C standard has the potential for greatly increasing the flexibility designers have for efficiently supporting the ever-expanding array of sensors in mobile systems.

Notwithstanding this potential, there are a number of issues that arise in I3C systems that include I²C devices. For example, I3C devices employ in-band interrupts and so don't require additional sideband communication channels with the host. By contrast, even when deployed on an I3C bus, I²C devices still require a dedicated sideband channel for interrupts to the I3C host. If each of the I²C devices has its own interrupt pin on the host, a significant advantage of the I3C standard is not realized. If the I²C devices share an interrupt line, the I3C host needs to poll the I²C devices sequentially to determine which device transmitted the interrupt, undesirably consuming I3C host processing time.

In addition, I²C devices typically exhibit much higher capacitance than I3C devices at their connections to the I3C bus. Not only can this limit the frequency of the bus to that of the slowest I²C device, it also can significantly reduce the number of devices that can be deployed on the bus.

Finally, the I3C standard explicitly limits the types of I²C legacy devices that are permissible on the I3C bus in various scenarios. For example, I²C secondary masters are not allowed on an I3C bus, only I²C slaves. In another example, the 50-nanosecond spike filter included in some I²C devices (for filtering I3C traffic) is not allowed in some scenarios. In still another example, the "clock stretching" feature of the I²C standard is not allowed on an I3C bus. Thus, in addition to the performance issues that arise with the deployment of I²C devices on an I3C bus, the I3C standard is not 100% backward compatible with a large number of legacy I²C devices that are likely to continue to be present on the market for a number of years.

SUMMARY

According to a particular class of implementations, an interconnect hub includes an I²C-compliant interface configured for communicating with a plurality of I²C slave devices on an I²C bus according to the I²C standard. The interconnect hub also includes one or more interrupt interfaces configured to receive I²C interrupts from the I²C slave devices. The interconnect hub also includes memory configured for storing identifiers of the I²C slave devices, interrupt information for each of the I²C slave devices, and data received from or directed to the I²C slave devices. The interconnect hub also includes an I3C-compliant interface configured for communicating with an I3C master device on an I3C bus according to the I3C standard. The I3C-compliant interface is also configured to, using the identifiers, the data, and the interrupt information, convert the I²C interrupts from the I²C slave devices to I3C interrupts for transmission on the I3C bus, and, in cooperation with the I²C-compliant interface, convert between I²C communications on the I²C bus and I3C communications on the I3C bus.

According to a specific implementation of this class, the I²C-compliant interface is an I²C master core.

According to another specific implementation of this class, the I²C-compliant interface is configured for communicating with a first I²C slave device that includes a spike filter, and for communicating with a second I²C slave device that does not include a spike filter.

According to another specific implementation of this class, the I²C-compliant interface is configured for communicating with a first I²C slave device configured to implement a clock stretching feature.

According to another specific implementation of this class, the I3C-compliant interface is an I3C slave core.

According to another specific implementation of this class, the I3C-compliant interface is configured for communicating with the I3C master device via the I3C bus at a maximum operating frequency of the I3C master device.

According to another specific implementation of this class, the I²C-compliant interface is configured to translate first voltage levels of the I²C slave devices to second voltage levels associated with the I3C bus.

According to another specific implementation of this class, the I3C-compliant interface and the I²C-compliant interface are configured to provide a hardware reset signal to one of the I²C slave devices on the I²C bus in response to a reset request received from the I3C master device.

According to another specific implementation of this class, the I3C-compliant interface or the I²C-compliant interface is configured to generate an error signal in response to a lack of acknowledgement from one of the I²C devices on the I²C bus, or in response to a signal line of the I²C being held low.

According to another specific implementation of this class, the memory is further configured to store values representing an operating frequency for each of the I²C slave devices.

According to another specific implementation of this class, the one or more interrupt interfaces comprise a single interrupt interface configured to receive I²C interrupts from the I²C slave devices.

According to another specific implementation of this class, the one or more interrupt interfaces comprise a plurality of interrupt interfaces, each interrupt interface being configured to receive one of the I²C interrupts from a corresponding one of the I²C slave devices.

A further understanding of the nature and advantages of various implementations may be realized by reference to the remaining portions of the specification and the drawings.

DETAILED DESCRIPTION

The present disclosure describes a hub device that enables the deployment of I²C devices in a system that also includes I3C devices. The hub isolates the I²C devices from an I3C bus on which the I3C devices are deployed and converts communications back and forth between the I²C and I3C domains. The hub has an I3C-compliant interface with which it communicates with an I3C master(s) on the I3C bus, an I²C-compliant interface with which it communicates with the I²C devices on an I²C bus, and logic and memory that supports the conversion between the two domains. In this way, the I3C master can effectively communicate with the I²C devices. With a hub enabled by the present disclosure, the advantages of the I3C standard may be fully realized in the I3C domain, while 100% backward compatibility with I²C devices may simultaneously be supported in the I²C domain.

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

Figure 1:
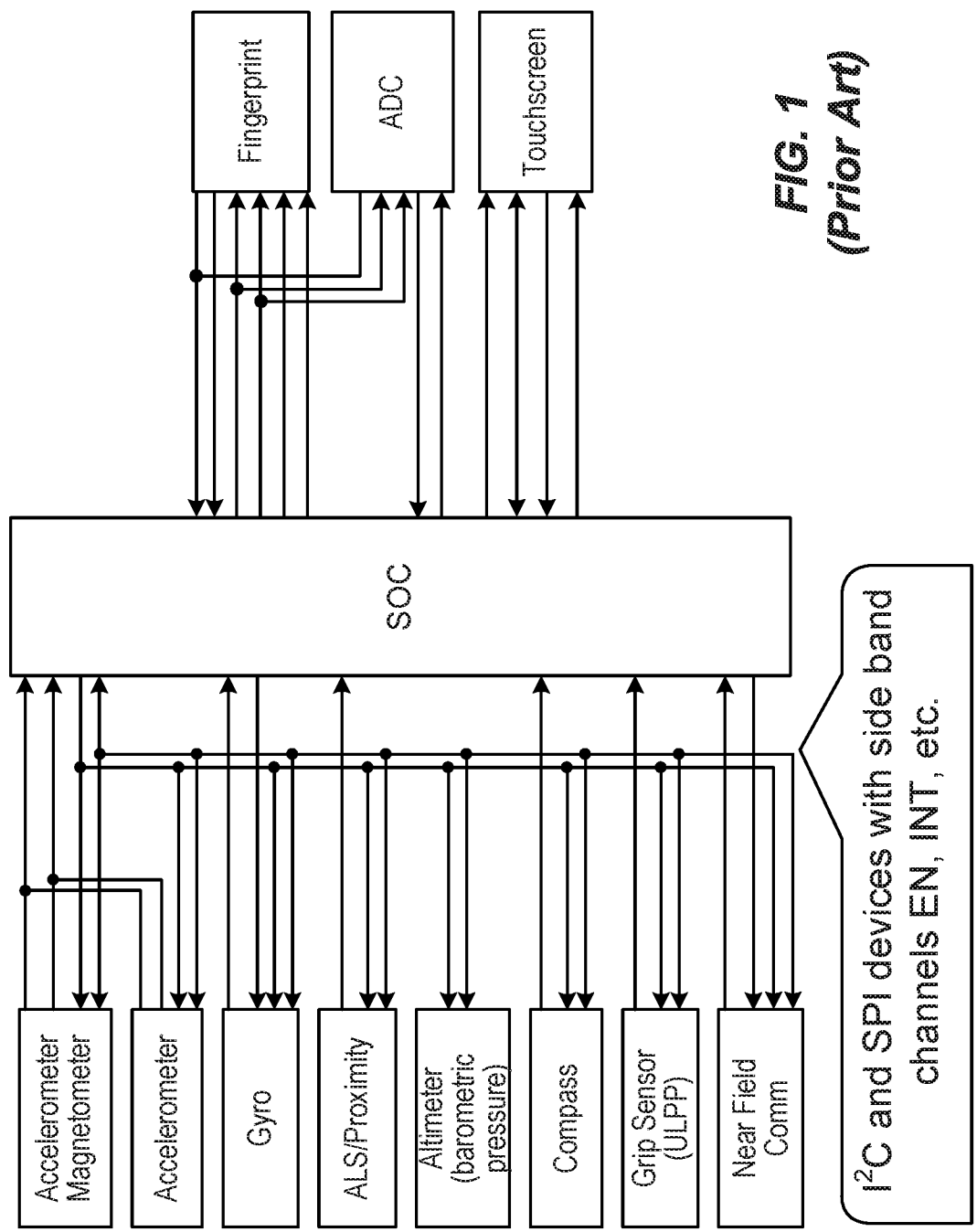
FIG. 1 is a simplified block diagram of an example of an I²C system.
Figure 2:
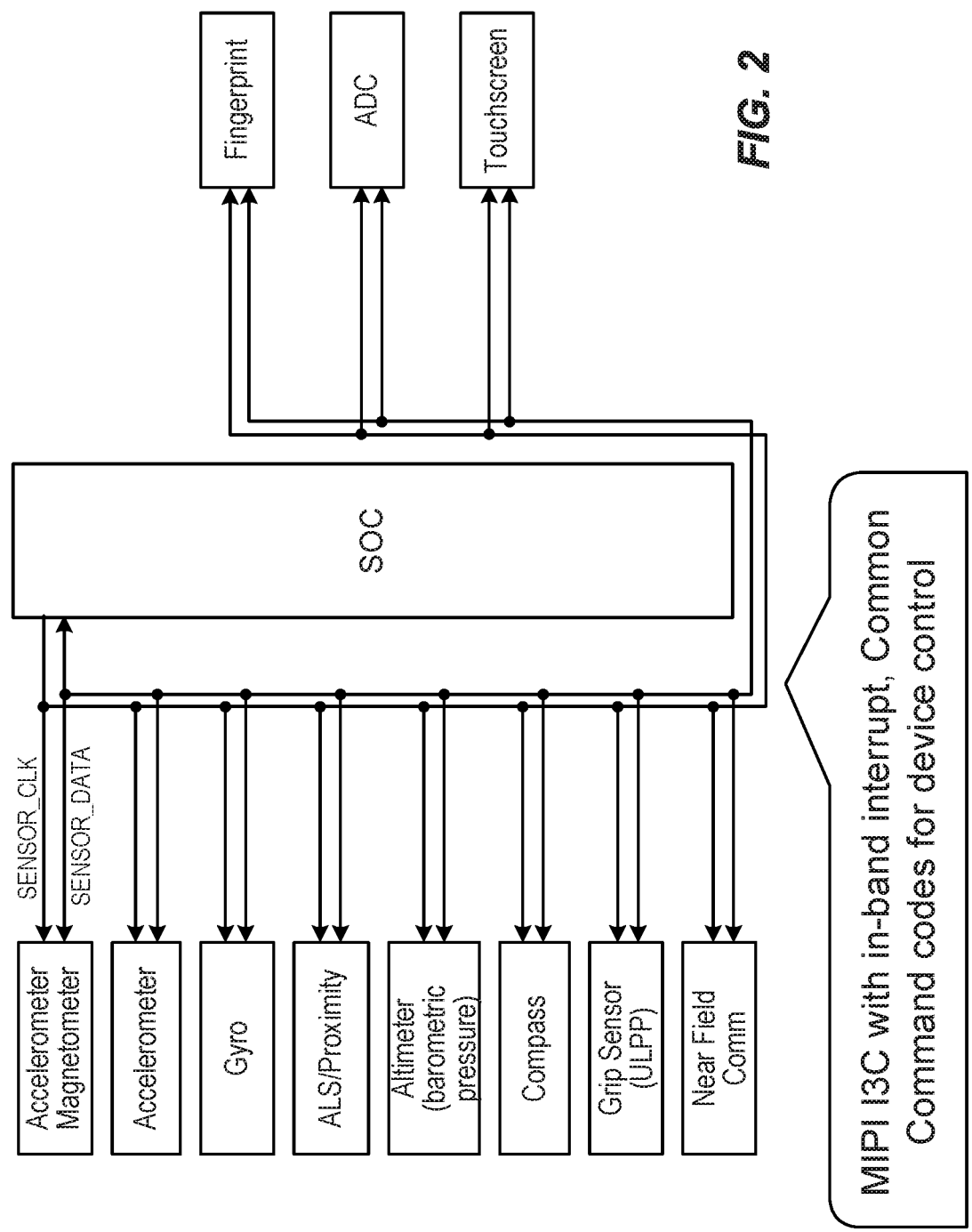
FIG. 2 is a simplified block diagram of an example of an I3C system.
Figure 3:
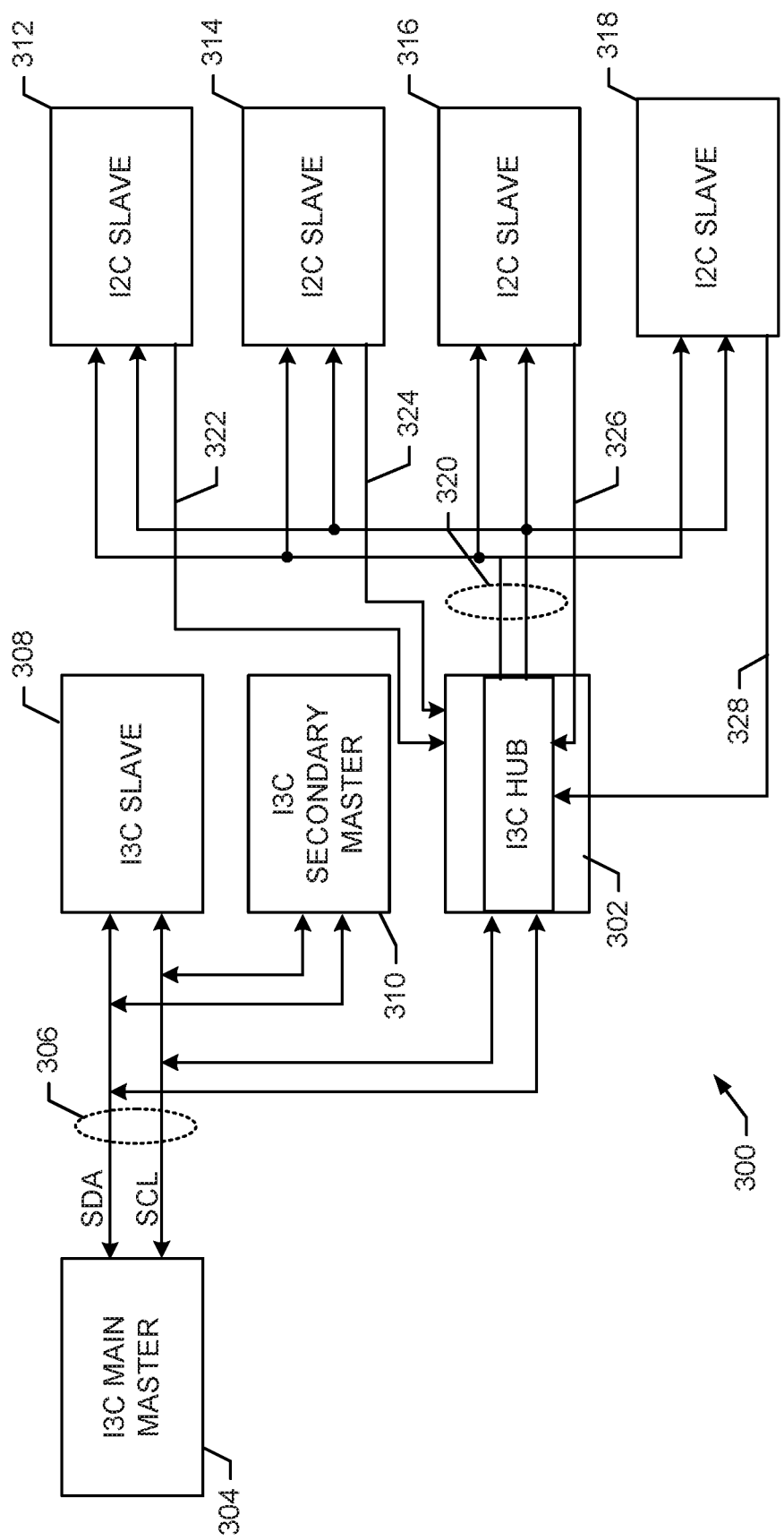
FIG. 3 is a simplified block diagram of an example of a system with an I3C hub enabled by the present disclosure.
Figure 4:
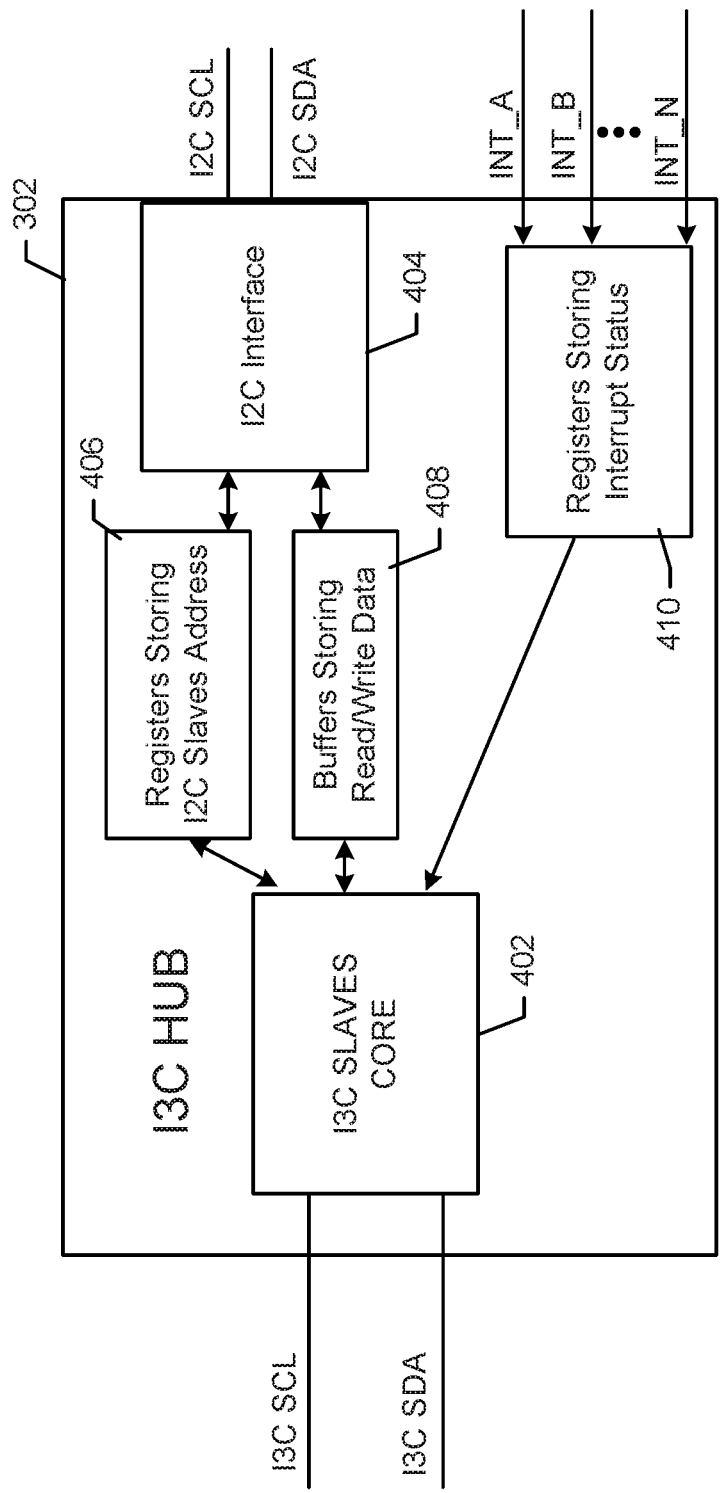
FIG. 4 is a simplified block diagram of an example of an I3C hub enabled by the present disclosure.

A particular implementation will now be described with reference to FIGS. 3 and 4. FIG. 3 is a simplified block diagram of a system 300 that includes both I3C and I²C devices and an I3C hub device 302 implemented as disclosed herein. FIG. 4 is a simplified block diagram of I3C hub device 302 according to a particular class of implementations. The depicted implementation includes an I3C-compliant interface 402 (which may be implemented as an I3C slave core) that interfaces with an I3C bus in the I3C domain (not shown for reasons of clarity) via signal lines I3C SCL and I3C SDA. Hub device 302 also includes an I²C-compliant interface 404 (which may be implemented as an I²C master core) that interfaces with an I²C bus of the I²C domain (also not shown) via signal lines I²C SCL and I²C SDA.

I3C hub 302 interfaces with an I3C master 304 via I3C bus 306 according to the I3C standard. Other I3C-compliant devices (e.g., I3C slave 308 and I3C secondary master 310) may be present on I3C bus 306. I3C hub 302 also interfaces with I²C slaves 312-318 via I²C bus 320 according to the I²C standard. I3C hub 302 also includes additional interfaces (e.g., signal lines 322-328) with the I²C slave devices that may represent, for example, interrupt lines, enable lines, etc. I3C hub 302 behaves in some respects like an I²C master when interacting with the I²C slaves. As shown, the I²C slave devices are not directly connected to I3C bus 306. By isolating the I²C devices from the I3C bus, it is possible to support all of features and functionalities of the I²C standard such as, for example, clock stretching, among others.

When I3C master 304 initiates a communication with a specific I²C slave, it sends an I3C-compliant message to hub 302. Hub 302 converts the message to the I²C domain and when the interaction with the specified I²C slave is complete, reports back to I3C master 304. Because the communication with the I²C slave is managed by hub 302, I3C master 304 does not need to wait for a response from the I²C slave and can instead handle other communications with any of the I3C devices on I3C bus 306 according to the I3C standard. This includes I3C hub 302 which might, for example, communicate with I3C master 304 on behalf of another one of the I²C slaves in the interim. Once the transaction with a specific I²C slave is complete, hub 302 sends an interrupt to I3C master 304.

I3C master 304 is programmed to be aware of the I²C slaves attached to hub 302. That is, I3C master 304 has the addresses of the I²C slaves and sends these to I3C hub 302 in connection with its communications with the I²C slaves. And because the I²C slaves are no longer on the I3C bus, their capacitances do not affect the I3C domain.

That is, in addition to the fact that the I3C master does not have to wait for responses from the I²C slaves, it also does not have to slow down the operating speed of the I3C bus due to the presence of the I²C slaves, instead being able to use the maximum speed allowed in the I3C domain. And because the I²C interrupts are handled by the hub, the I3C master is able to communicate with all of the devices in the system using only two lines as intended by the I3C standard.

Referring again to FIG. 4, I3C hub 302 includes an I3C slave core 402 and registers and/or buffers for storing the I²C slave addresses (406), read/write data (408), and I²C interrupt status (410). Slave address registers 406 and read/write buffers 408 connect to I²C-compliant interface 404, and interrupt status registers 410 connect to I3C slave core 402. As shown in the figure and according to some implementations, I3C hub 302 may include a dedicated input for interrupts from each of the I²C slave devices. Alternatively, implementations are contemplated in which only one or fewer inputs are required to receive interrupts from the I²C slave devices, i.e., more than one of the I²C slave devices can share an interrupt line.

According to some implementations, I²C-compliant interface 404 is a physical layer interface implemented according to the I²C standard, i.e., a stripped down I²C-compliant interface that includes only a subset of the features of an I²C master. For some implementations, only the most basic I²C read and write functions are needed. However, it should be noted that implementations are contemplated in which interface 404 is implemented using an I²C master core to communicate with the I²C devices.

I3C Hub 302 interfaces with the I²C slaves according to I²C standard and has one or more dedicated I/Os and registers for interrupts from the I²C slaves so that it can track which device sent a given interrupt. As mentioned above, I3C hub 302 converts each I²C hardware interrupt (i.e., an interrupt to a specific pin on the hub from an I²C device) to an I3C software interrupt (i.e., an in-band interrupt transmitted on the I3C bus). I3C slave core 402 reads the interrupt status registers 410 and generates I3C-compliant in-band interrupts and transmits them to the I3C master on the I3C bus.

Hub 302 also converts communications back and forth between the I²C and I3C domains. For example, when the I3C master reads from or writes to one of the I²C slaves, it sends a read or write command on the I3C bus to I3C slave core 402 hub indicating which I²C slave (e.g., by address) and how many bytes of data are to be read or written. I3C slave core 402 passes the command to I²C interface 404 which then performs that transaction with the specified I²C slave device via the I²C bus. The result of the transaction is passed along to I3C slave core 402 which then communicates that result (e.g., bytes of read data or a successful write acknowledgement) to the I3C master.

In one example, when an I²C slave device on the I²C bus sends an interrupt, the I3C Hub issues in-band interrupt (IBI) to the I3C master. The I3C master reads the interrupt status register of to I3C Hub to identify the I²C slave device to which the interrupt corresponds. For a write operation to the I²C slave, the I3C master writes data to the buffer register of the I3C Hub in a communication that identifies the number of bytes to be written and the I²C slave address. The I3C hub sends an IBI to the I3C master when the write operation is complete.

For a read operation, the I3C master sends a communication to the I3C hub that identifies the number of bytes to be read and the I²C slave address. The I3C hub sends an IBI to the I3C master when the read operation is complete.

Depending on the implementation, one or more of the following advantages may be realized with an I3C hub enabled by the present disclosure. For example, because the large loading capacitances of I²C slaves are isolated from the I3C bus, the I3C bus can achieve its highest operating speed and/or maximize the number of I3C devices connected to the I3C bus.

In another example, an I3C master does not need to read individual I²C interrupts, simplifying the configuration of the I3C master relative to systems in which I²C slaves are connected directly to the I3C bus. This may also reduce the latency associated with the processing of I²C interrupts.

In another example, an I3C hub enabled by the present disclosure can support I²C devices that perform clock stretching as specified by the I²C standard.

In another example, an I3C hub enabled by the present disclosure can reduce or eliminate the need for dedicated hardware pins on an I3C master or host (e.g., pins for I²C hardware interrupts).

In another example, an I3C hub enabled by the present disclosure eliminates or reduces the use of I3C bus bandwidth for slow I²C communications.

In another example, an I3C hub enabled by the present disclosure acts to isolate I²C devices with inaccurate 50 nanosecond spike filters from the I3C bus, allowing such devices to be included in the overall system without negatively affecting the operating speed of the I3C bus.

According to some implementations, an I3C hub enabled by the present disclosure may also include frequencies registers to support different working frequencies for the I²C slave devices. According to one such implementation, the working frequencies for the I²C slaves are set by values of internal registers of the I3C hub. In this way, each slave can work at its optimal frequency.

According to some implementations, an I3C hub enabled by the present disclosure may include voltage translation at the I²C-compliant interface to support different voltage levels employed by the I²C slave devices. For example, there are I²C devices on the market that operate using different supply voltages ranging from 1.8V to 5V, while I3C hosts operate using supply voltages ranging from 1.2 to 3.3V. According to such implementations, different I²C devices may be connected to different I²C buses having different voltages via an I3C hub enabled by the present disclosure.

According to some implementations, an I3C hub enabled by the present disclosure may include logic that generates error signals for reporting to an I3C master for such conditions as an SDA/SCL signal line on the I²C bus being held low, or a lack of acknowledgement by an I²C slave device, i.e., a NACK.

According to some implementations, an I3C hub enabled by the present disclosure may provide active-high and low outputs for hardware reset of I²C slaves that are responsive to reset requests from the I3C master.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. An interconnect hub, comprising:
an inter-integrated circuit (I2C)-compliant interface configured for communicating with a plurality of (I2C) slave devices on an (I2C) bus according to the (I2C) standard;
one or more interrupt interfaces configured to receive (I2C) interrupts from the (I2C) slave devices;
memory configured for storing identifiers of the (I2C) slave devices, interrupt information including an interrupt status for each of the (I2C) slave devices, and data received from or directed to the (I2C) slave devices; and
an improved inter-integrated circuit (I3C)-compliant interface configured for communicating with an (I3C) master device on an (I3C) bus according to the (I3C) standard, the (I3C)-compliant interface also being configured to, using the identifiers, the data, and the interrupt information, convert the (I2C) interrupts from the (I2C) slave devices to (I3C) interrupts for transmission on the (I3C) bus, and, in cooperation with the (I2C)-compliant interface, convert between (I2C) communications on the (I2C) bus and (I3C) communications on the (I3C) bus, wherein the interconnect hub is configured to handle the transactions with the (I2C) slave devices using the interrupt status corresponding to each such that the (I3C) master device can initiate a transaction with a first (I2C) slave device and communicate with an (I3C) slave device on the (I3C) bus or a second (I2C) slave device before receiving a response from the first (I2C) slave device.

2. The interconnect hub of claim 1, wherein the I²C-compliant interface is an I²C master core.

3. The interconnect hub of claim 1, wherein the I²C-compliant interface is configured for communicating with a first I²C slave device that includes a spike filter, and for communicating with a second I²C slave device that does not include a spike filter.

4. The interconnect hub of claim 1, wherein the I²C-compliant interface is configured for communicating with a first I²C slave device configured to implement a clock stretching feature.

5. The interconnect hub of claim 1, wherein the I3C-compliant interface is an I3C slave core.

6. The interconnect hub of claim 1, wherein the I3C-compliant interface is configured for communicating with the I3C master device via the I3C bus at a maximum operating frequency of the I3C master device.

7. The interconnect hub of claim 1, wherein the I²C-compliant interface is configured to translate first voltage levels of the I²C slave devices to second voltage levels associated with the I3C bus.

8. The interconnect hub of claim 1, wherein the I3C-compliant interface and the I²C-compliant interface are configured to provide a hardware reset signal to one of the I²C slave devices on the I²C bus in response to a reset request received from the I3C master device.

9. The interconnect hub of claim 1, wherein the I3C-compliant interface or the I²C-compliant interface is configured to generate an error signal in response to a lack of acknowledgement from one of the I²C devices on the I²C bus, or in response to a signal line of the I²C being held low.

10. The interconnect hub of claim 1, wherein the memory is further configured to store values representing an operating frequency for each of the I²C slave devices.

11. The interconnect hub of claim 1, wherein the one or more interrupt interfaces comprise a single interrupt interface configured to receive I²C interrupts from the I²C slave devices.

12. The interconnect hub of claim 1, wherein the one or more interrupt interfaces comprise a plurality of interrupt interfaces, each interrupt interface being configured to receive one of the I²C interrupts from a corresponding one of the I²C slave devices.

* * * * *